Patented Jan. 2, 1945

2,366,353

UNITED STATES PATENT OFFICE 2,366,353

CEMENT SOFTENER AND PROCESS OF USING THE SAME

Earle C. Pitman, Red Bank, N. J., assignor to E. I. du Pont de Nemours & Company, Wilmington, Del., a corporation of Delaware No Drawing. Application August 1, 1942, Serial No. 453,233

15 Claims. (Cl. 154—40)

This invention relates to improvement in adhesively joining surfaces and more particularly to a composition and method for activating a dried cellulose derivative film on the surfaces to be joined. The invention is particularly adapted to the manufacture of shoes.

This application is a continuation-in-part of my co-pending application S. N. 380,456, filed February 25, 1941.

In the manufacture of footwear of all kinds, it has been common practice to sew the sole to the upper either directly or through the medium of a welt. More recently, however, particularly in the manufacture of women's shoes, this method has been replaced by a process which consists in adhesively joining the sole to the upper by means of a suitable cement which in the most important commercial practice contains a cellulose derivative, usually cellulose nitrate. In operating this more economical process, the marginal area of the shoe sole and the overlasted portion of the upper are roughened by buffing or other suitable means and the adhesive applied to these areas by brushing or by mechanical extruding devices. After the adhesive composition has dried or hardened by the evaporation of volatile solvents contained in the composition, the parts can be stored until it is desired to assemble them in the manufacture of the complete shoe. At that time the cement on one or both of the parts (usually the cement on the sole only) is activated or softened by applying an active solvent composition to the surface of the cement and the parts then assembled in proper relation in a pressure device where they are held under pressure until the cement has dried and the parts thus securely joined.

The conventional active solvent compositions (usually called cement softeners or activators) consisting entirely of volatile ingredients or modified with a small quantity of a substantially non-volatile liquid material such as dibutyl phthalate or a solid ingredient such as cellulose nitrate, are characterized by several defects which reduce the efficiency of the process. In some instances, "skips" (areas where the shoe parts are not effectively united) are encountered. In others, staining of the shoe uppers by migration of the softener from the area of application takes place. Also, if the softener consists of highly volatile materials in order to shorten the time required for the assembled parts in the pressure device, there is not sufficient time to permit proper positioning of the parts and some areas may be dry before the unit is placed under pressure so that there is no bond or only a weak bond at these points. If the solvents are adjusted to permit a longer time for assembling the parts, then the time required in the pressure device to dry or harden the cement is excessive. Those softener compositions containing a small proportion of solids ingredients as heretofore available are defective in that when the pressure is applied to the assembled parts, the softener is squeezed out at the joint between the sole and the upper resulting in an unsightly appearance and requiring an extra operation to remove this material from the shoe exterior.

The present invention, however, overcomes the several defects which characterize the previously available cement softeners and greatly promotes the efficiency of the manufacture of shoes by cementing processes.

This invention has as the primary object the provision of a cement softener which when applied to a dry cement film prevents too rapid escape of activating solvents prior to assembling the parts and yet does not require excessive periods of "dwell" in the pressure device to effect an acceptable bond between the parts to be joined.

Another object of the invention is the provision of a cement softener which is less susceptible to squeeze out between the surfaces when pressure is applied to the parts being joined.

Another object is the provision of a cement softener which prevents staining or soiling of surfaces outside the cement coated areas.

Another object is the provision of a cement softener which can conveniently be employed with mechanical extruding devices for applying the softener to the dry cement film.

A further object is the provision of a process for cementing surfaces which eliminates "skips" and greatly improves uniformity of the joint.

A further object is the provision of a process for cementing surfaces which affords substantial operating economies and reduces the number of "rejects" due to faulty bonds such as are encountered in conventional practice.

A still further object is the provision of a cement softener which is particularly adapted for use in the manufacture of cemented shoes.

Other objects will appear as the description of the invention proceeds.

These objects are accomplished by means of an improved cement softener composition comprising dynamite cellulose nitrate dissolved in a liquid volatile vehicle containing at least one active solvent for the dynamite cellulose nitrate and for the dried cement.

The following examples are given by way of illustration only and no limitations are intended thereby except as indicated in the appended claims.

Example I

|  | | Per cent by weight |
|---|---|---|
| First portion | Dynamite cellulose nitrate | 1.3 |
| | Acetone | 20.0 |
| | Diethyl ether | 20.0 |
| | Denatured ethyl alcohol (23A) | 0.7 |
| Second portion | Acetone | 12.6 |
| | Diethyl ether | 45.4 |
| | | 100.0 |

The first portion is compounded in any suitable manner known in the art. After the nitrocellulose has dissolved, the second portion is added with stirring. With the dynamite cellulose nitrate it is desirable to mix the composition somewhat longer than is customary with conventional forms of cellulose nitrate in order to insure a stable final viscosity.

The viscosity of this composition was 414 centipoises.

The cellulose nitrate used in this example was dynamite cellulose nitrate which is commonly employed in the manufacture of explosives. It is characterized by an extremely high viscosity and gel structure in suitable solvents, for example, acetone. It differs from low viscosity or even so-called 1,000 seconds viscosity nitrocellulose (types which are available for general finishing and adhesive utility) by its gel structure or false body characteristic in solution and by the avoidance of any intentional treatment in its manufacture to reduce its viscosity characteristic. Particular care is taken in the manufacture of dynamite cellulose nitrate to prevent any substantial reduction in viscosity characteristic or destruction of the gel structure property of the cellulose or cellulose nitrate. The viscosity of the dynamite cellulose nitrate is between about 40 seconds and 200 seconds in a 3% solids concentration in acetone as determined in accordance with the procedure hereinafter described.

The dynamite cellulose nitrate used in this example was prepared by methods well known in the art. Cotton linters previously subjected to only a very mild digestion at atmospheric pressure to remove oils and fats are nitrated at a temperature of 0–5° C. for about 30 minutes with a nitrating acid mixture of which the following is typical:

|  | Per cent |
|---|---|
| Nitric acid | 28.85 |
| Sulfuric acid | 56.91 |
| Nitrosyl sulfuric | 2.82 |
| Water | 16.42 |
| | 100.00 |

The nitrogen content of dynamite cellulose nitrate is usually between about 12.15 and 12.35%. The product has an exceptionally high viscosity characteristic and cannot be dissolved in volatile solvents and diluents in any considerable concentration. As an arbitrary (but necessary modification of the A. S. T. M. D–301–33) measure of the viscosity characteristic of this type of cellulose nitrate, the cellulose nitrate of Example I was dissolved in acetone in the proportion of 3% by weight. This is because a 12.2% solution as called for by the A. S. T. M. method could not be made. The viscosity of this solution determined in accordance with the modified falling ball method was 95.2 seconds. A similar determination on a heavy coating type cellulose nitrate, which had a viscosity characteristic of 1,090 seconds in Formula A of A. S. T. M. Specification D–301–33, had a viscosity of only 0.3 second for a 3% solution in acetone. Another test was made on a similar high viscosity nitrocellulose of a viscosity of 4,670 seconds (A. S. T. M. Formula A) and a value of 0.5 second was obtained. These figures are directly comparable and illustrate the extremely high viscosity characteristic of the dynamite cellulose nitrate as compared to a so-called high viscosity dope cellulose nitrate commonly employed for coating purposes.

The cement softener of Example I was employed in joining shoe sole leather strips (6″ x 1″ and about ⅛″ in thickness) by first applying a cellulose nitrate cement of the following composition to the previously buffed leather surface by brushing.

Example II

|  | Per cent by weight |
|---|---|
| Cellulose nitrate (6 sec. A. S. T. M. Spec. D–301–33 Formula A) | 17.6 |
| Dibutyl phthalate | 4.4 |
| Isopropyl acetone | 40.8 |
| Butyl acetate | 1.6 |
| Hexane | 20.6 |
| Denatured ethyl alcohol | 15.0 |
| | 100.0 |

The cement coated leather strips were allowed to thoroughly dry. The softener of Example I was then brushed uniformly over the dried cement film on the surface of the leather strips. Pairs of the strips were then immediately placed in a conventional shoe cementing pressure device with the cement coated surfaces together and pressure applied at 50 pounds per square inch for 3 minutes. With the ordinary liquid softeners, the period of "dwell" in the pressure device required would be about 10 minutes. An examination of the strips after removal showed that a uniform bond had been secured without extrusion of any of the material to the exterior surfaces of the strips. It was found that if due to application of excess softener, some small amount of softener reached the exterior surfaces, it could be readily and completely removed by a stiff bristle brush since the dried softener is quite brittle. The bond was uniformly strong over the entire area of the leather strips and no "skips" were observed. The joint strength was comparable to that obtained by conventional methods. There was no evidence of staining of exterior surfaces of the leather.

The extremely high viscosity characteristic of the dynamite cellulose nitrate and the tendency of this material to quickly form a gel structure during evaporation of the volatile solvents in the softener composition are the basic factors which establish the remarkable superiority of the new product for the uses indicated and distinctively set it apart from cement softeners heretofore available. Thus, the almost instantaneous setting up of a gel structure after application of the softener to a dried cement film traps the active volatile cellulose nitrate solvents and retains them on the surface of the cement film for a sufficient time to thoroughly activate the cement. Also, because of this unusual and unique property, excessive haste on the part of the operator in properly positioning the parts to be joined and placing them in a pressure device is avoided. In prior practice, unless the parts were positioned quickly, the volatile solvents were sometimes dissipated from all or part of the cement area before the parts were joined, thus causing faulty joints and an excessive number of rejects. The high viscosity characteristic of the dynamite cellulose nitrate is of particular advantage since it permits the use of much lower solids in obtaining the desired high viscosity in the softener composition which aids in preventing the migration of the softener to areas adjacent to the cement coated areas, thus preventing staining and soiling of exterior surfaces. This property also greatly aids in the application of the softener, permitting the use of much less skilled labor for this operation.

The viscosity of the softener composition is also important to the successful operation of the invention. This may be adjusted by varying the solids content of the softener, particularly the amount of dynamite cellulose nitrate used. In general, operable compositions may have a viscosity between about 100 and 1,500 centipoises (in certain instances the viscosity may be somewhat higher) although it is preferable to employ compositions which have a viscosity of between about 100 and 500 centipoises. Operation within this preferred lower range of viscosities is permitted directly because of the peculiar characteristics of the dynamite cellulose nitrate since the new properties are not found in any of the presently available commercial general utility cellulose nitrates included in the highest viscosity characteristic type, namely, the so-called 1,000 second cellulose nitrate.

Due to the very high viscosity characteristic of the dynamite cellulose nitrate and its unique tendency to form a gel structure quickly at the start of the evaporation of the volatile solvents when applied to a cement surface, it is possible and quite desirable to use a lower solids content than has heretofore been possible with conventional cellulose nitrates in order to obtain the high viscosity in the final composition and to afford the trapping of solvents on the cement film surface. Amounts of dynamite cellulose nitrate of from about 0.2 to 2.0% may conveniently be used although for most purposes it is preferred to use about 0.7 to 1.5%.

The new softener compositions are not limited with respect to volatile solvents and diluents since other solvents of the type shown in the example including esters and ketones such as butyl acetate, ethyl acetate, acetone, methyl ethyl ketone, isopropyl acetate, propylene oxide and diluents, such as butyl alcohol, diethyl ether, aliphatic and aromatic hydrocarbons, may be used taking care that the active solvent portion of the volatile vehicle is present in sufficient quantity to insure complete solution of the cellulose nitrate. In general, it is preferred to use solvents and diluents which are highly volatile, that is, those with high evaporation rates in order to reduce the necessary time of "dwell" in the pressure device to afford the required joint strength.

The use of plasticizers and compatible resins is also permissible in some cases but these materials, if included, should preferably be kept to a minimum so as to not detract from the superior properties imparted by the dynamite cellulose nitrate. It is also possible to include a minor proportion of a conventional coating type cellulose nitrate preferably of high viscosity but any appreciable quantities of such material tends to reduce the desirable improvements afforded by the dynamite cellulose nitrate and the amount added if any should be small in order to avoid adverse effects on the "false body" property which distinctively characterizes the dynamite cellulose nitrate.

The new cement softener is of general utility in the activation of cements which may be softened or rendered tacky with the liquid vehicle containing the dynamite cellulose nitrate and is particularly useful in the manufacture of shoes for joining the shoe sole to the upper. The invention is also useful in the manufacture of leather belts such as those employed for power transmission, laminating plywood, joining Celluloid and other plastic objects, motion picture film, lacquered paper or lacquered regenerated cellulose sheeting and sealing cellulose derivative wrapping materials. The new compositions may be used in the fabrication of laminated paper containers from lacquer coated paper and for joining the abutted edges of carpet seams where cellulose nitrate cements are commonly employed. The invention may also be used in conjunction with the novel cementing methods disclosed in U. S. Patents 2,283,946 and 2,087,480 which describe means for joining surfaces by vacuum and high frequency electrical treatments, respectively.

Various types of cements containing polymeric organic materials including cellulose derivatives, for example, cellulose esters such as cellulose nitrate, cellulose acetate, cellulose butyrate, cellulose propionate and the mixed cellulose esters, cellulose ethers, natural resins and synthetic resins such as alkyds, vinyls, acrylic and methacrylic acid resins, and urea-formaldehyde resins may be activated or softened by the new softener provided only that such cements are dissolved or attacked by the liquid volatile vehicle of the compositions of the invention.

The invention offers numerous advantages which are of considerable practical and economic importance in the field of adhesively joining surfaces, particularly in the manufacture of shoes. Labor costs are materially reduced since less adept operators may be employed because of the more fool-proof nature of this new softener. Rejects attributed to faulty joints resulting from "skips" in the step of applying the cement softener are avoided because a more uniform distribution of the softener over the dried cement film is accomplished and because the softener forms a gel which retains the volatile solvents for a sufficient period (for 30 seconds and more) to permit accurate positioning of the parts to be joined. However, the actual time required for effecting the joint in the pressure device is reduced, thus speeding up production. The softener may be applied manually with a brush or preferably with a mechanical extruding device which also contributes to the securing of a more uniform joint because a more controlled application of the softener can be obtained with such device. Because of the rapid formation of a gel after application of the softener, staining of the exterior of the parts to be joined is completely avoided. If any of the material is extruded to the exterior surfaces, it can be readily removed with a stiff bristled brush. Another advantage resides in the high viscosity of the softener composition as obtained with appreciably lower solids content as compared to softeners of similar type heretofore available which required markedly higher solids content to obtain equal viscosity and which did not exhibit a tendency to form a gel, a property that distinctively sets the new products apart as greatly superior for the indicated purposes. Solvents of higher evaporation rates and greater proportions of such solvents can be used in the new compositions since the rapid formation of a gel structure traps the solvents and retains them until the parts are properly positioned but after the pressure is applied the gel structure is broken and the highly volatile solvents are then rapidly dissipated. The peculiar nature of the composition also affords better control of the amount of softener applied, thus avoiding undue waste.

It is apparent that many widely different embodiments of the invention may be made without departing from the spirit and scope thereof, and therefore, it is not intended to be limited except as indicated in the appended claims.

I claim:

1. A composition for activating dry cellulose derivative and resinous cements comprising from about 0.2 to 2.0% by weight of dynamite cellulose nitrate a 3% acetone solution of which has a viscosity of from 40 to 200 seconds, and a liquid volatile vehicle containing at least one solvent for the said cellulose nitrate and the dry cement, the viscosity of the said composition being of the order of 100 to 1500 centipoises.

2. The composition of claim 1 in which the viscosity characteristic of the dynamite cellulose nitrate is about 95 seconds in a 3% solids acetone solution.

3. The composition of claim 1 in which the dynamite cellulose nitrate is present in amount between 0.7 and 1.5% by weight.

4. The composition of claim 1 in which the viscosity is between about 100 and 500 centipoises.

5. The composition of claim 1 in which the sole solids ingredient is dynamite cellulose nitrate.

6. The product of claim 1 having approximately the following composition:

| | Percent by weight |
|---|---|
| Dynamite cellulose nitrate | 1.3 |
| Acetone | 20.0 |
| Diethyl ether | 20.0 |
| Denatured ethyl alcohol (23A) | 0.7 |
| Acetone | 12.6 |
| Diethyl ether | 45.4 |
| | 100.0 |

7. In the process of cementing surfaces wherein at least one surface is coated with a cement containing a polymeric organic material and allowed to dry before joining the surfaces, the improvement which comprises activating the dried cement with a composition comprising from about 0.2 to 2.0% by weight of dynamite cellulose nitrate a 3% acetone solution of which has a viscosity of from 40 to 200 seconds, and a liquid volatile vehicle containing at least one solvent for the cement, the viscosity of the said composition being of the order of 100 to 1500 centipoises.

8. The process of claim 7 in which the polymeric organic material is a cellulose ester.

9. The process of claim 7 in which the polymeric organic material is cellulose nitrate.

10. The process of claim 7 in which the cement is a cellulose nitrate cement and the liquid volatile vehicle in the softener contains a ketone.

11. The process of claim 7 in which the viscosity characteristic of the dynamite cellulose nitrate is about 95 seconds in a 3% solids acetone solution.

12. The process of claim 10 in which the dynamite cellulose nitrate is present in amount between 0.7 and 1.5%.

13. The process of claim 7 in which the viscosity is between about 100 and 500 centipoises.

14. The process of claim 7 in which the said composition is as follows:

| | Percent by weight |
|---|---|
| Dynamite cellulose nitrate | 1.3 |
| Acetone | 20.0 |
| Diethyl ether | 20.0 |
| Denatured ethyl alcohol (23A) | 0.7 |
| Acetone | 12.6 |
| Diethyl ether | 45.4 |
| | 100.0 |

15. A gelatinous composition suitable for activating dry cellulose derivative cements which consists of from 0.7 to 1.5% of dynamite cellulose nitrate said dynamite cellulose nitrate having a viscosity characteristic of between 40 and 200 seconds in a 3% acetone solution, about 32.6% acetone and the balance being an organic volatile non-solvent liquid for the said cellulose nitrate.

EARLE C. PITMAN.